Oct. 16, 1923.
H. SCHIFF
AUTOMOBILE TRANSMISSION LOCK
Filed Oct. 24, 1922   2 Sheets-Sheet 1
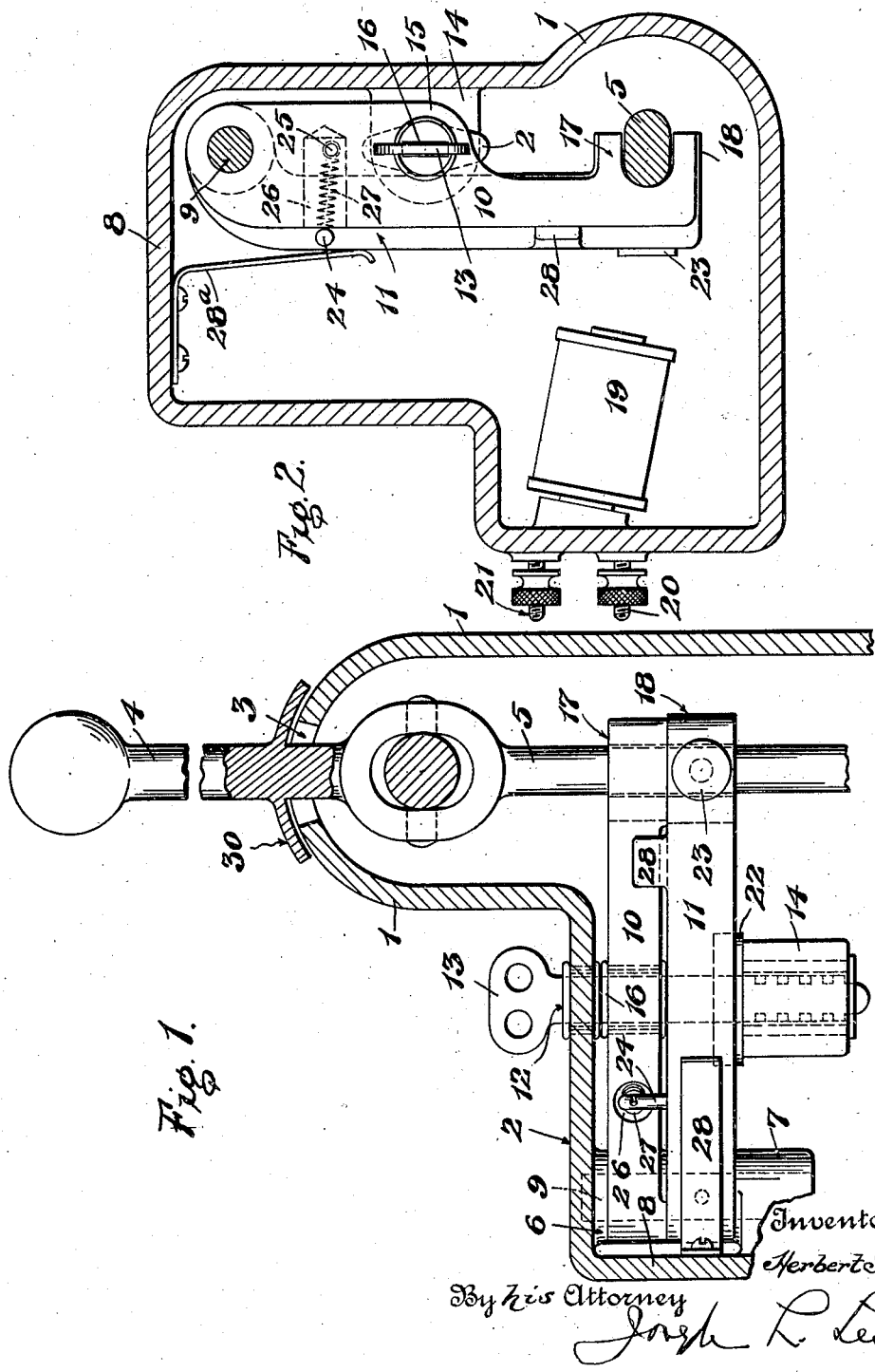

Oct. 16, 1923.
H. SCHIFF
1,471,212
AUTOMOBILE TRANSMISSION LOCK
Filed Oct. 24, 1922
2 Sheets-Sheet 2
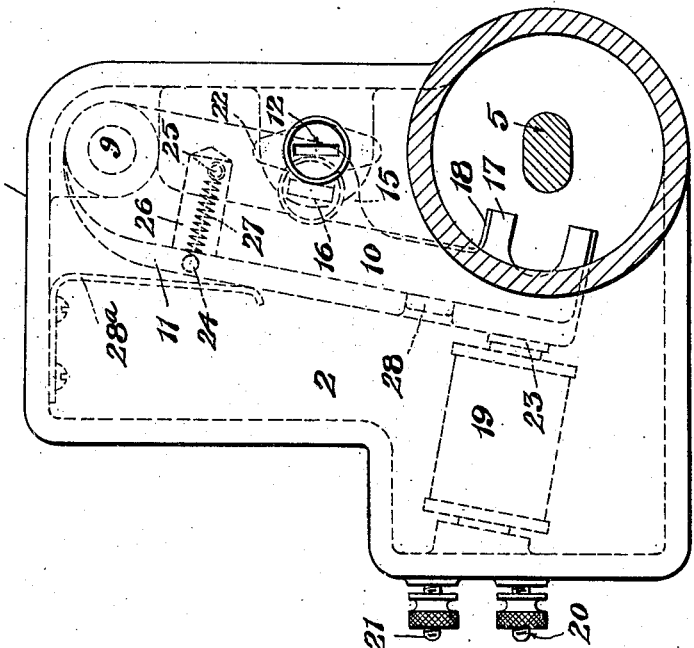
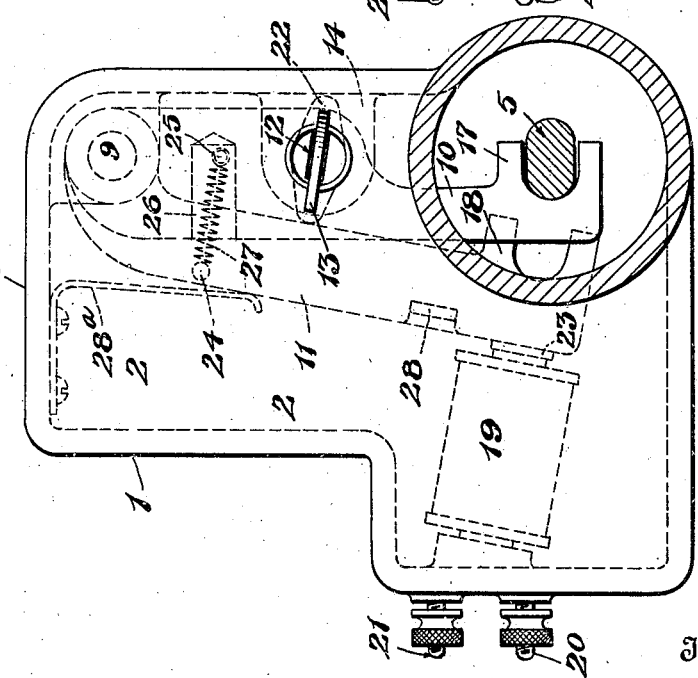
Inventor
Herbert Schiff
By his Attorney Patented Oct. 16, 1923.

1,471,212

UNITED STATES PATENT OFFICE.

HERBERT SCHIFF, OF NEW YORK, N. Y.

AUTOMOBILE TRANSMISSION LOCK.

Application filed October 24, 1922. Serial No. 596,539.

*To all whom it may concern:*

Be it known that I, HERBERT SCHIFF, a citizen of the United States, and a resident of the city, county, and State of New York, have invented a certain new and useful Improvement in Automobile Transmission Locks, of which the following is a specification.

This invention relates to an improvement in a lock adapted to be used in connection with an automobile transmission, or any other operating part of the car, and has for its object to provide a device of this character which will be automatically locked when the motor of the car is stopped by the use of the ignition switch, whereby the possibility of the operator of the car forgetting to lock his car is avoided. I understand that there are many forms of transmission locks in use at the present time, and I have found that the main difficulty with the present forms of lock is that the same have to be manually operated. With these forms when the operator of the car fails to use or lock the car the car is left liable to theft.

The main object, therefore, of my invention is to provide a form of lock which will automatically go into operation when the ignition switch is shut off to cause the motor to cease operation; which will be of simple construction and not likely to get out of order, and which will be positive and certain in operation.

A further object of this invention is to provide a lock of such construction that it is not completely unlocked until the key is removed from the lock. This avoids the possibility of the car owner or operator unlocking the lock and forgetting to remove the key from the lock, consequently leaving the lock in condition to be readily opened by a thief. I have thus provided a lock which is automatically locked when the car is stopped and which prevents the car from being used until the key has been removed from the lock after the lock has been partly unlocked thereby.

With these objects, and other objects which may hereinafter appear, in view, I have devised the particular arrangement of parts hereinafter set forth and more particularly pointed out in the claims appended hereto.

Reference is to be had to the accompanying drawings, forming a part hereof, in which—

Figure 1 is a vertical sectional view of a portion of an automobile transmission case of conventional form, showing my improved locking mechanism;

Figure 2 is a plan view of the locking mechanism, with the upper portion of the transmission case being shown in section to disclose construction;

Figure 3 and Figure 4 are plan views of the transmission, showing the operation of the lock.

Throughout the various views of the drawings similar reference characters designate similar parts.

In the preferred embodiment of my invention, as disclosed in the accompanying drawings, I have shown a gear-case or transmission-enclosing case of conventional form, as at 1, which is provided with a top plate 2, and an opening 3 therein through which the gear-shift lever 4 extends. The opening 3 is shown covered by a plate 30 secured on the shift lever. The gear-shift lever 4 has its lower end connected or linked in any desired way to the gear-operating rod 5, which extends through the transmission case. All of these details are found on most automobiles, and although varying somewhat in minor details of construction on the various makes of cars, they are in the main respects all similar in construction and operation. These details of construction, being of usual form, constitute no part of my invention.

At 6 is disclosed a boss on the upper plate 2 of the transmission case, and a co-operating boss 7 extends from one of the side walls 8 of the casing, and mounted in these bosses 6 and 7 is a suitable pivot pin 9 upon which locking levers 10 and 11 are pivoted.

The upper plate 2 of the casing is provided with a key-hole 12 which receives a key 13 for the operation of a suitable lock 14 held within the casing. The upper lever 10 is provided with a lug 15 in which a key-hole 16 is provided. The lever 10 being movable, as will be hereinafter described, it will be seen that in order to permit the entry of the key into the lock 14, the two keyholes 12 and 16 have to register or be located in direct alignment.

The lever 10, which is the upper lever, is provided at its outer or free end with a yoke 17 intended to embrace the gear-actuating lever 5 when said lever 5 is in its free or "neutral" position, and restrain said lever 5 against any movement which would cause interengagement of the transmission gears. The yoke 17 is so shaped that it will only embrace the lever 5 when said lever is in its "neutral" position. When the lever 10 is so positioned that its yoke 17 embraces the rod 5 it is in its "locked" position.

The lower lever 11 is provided at its free end with a yoke 18, which is similar in all respects to the yoke 17 on the lever 10, and this yoke 18 also embraces the gear rod 5 with the lever 10. The two levers 10 and 11 thus co-operate to lock the gear-actuating rod 5 in its neutral position and retain the same in such locked position until freed by means of the key 13 as will be pointed out.

At 19 is shown an electro-magnet which extends from one side of the casing at an angle, and this electro-magnet is adapted to be energized by an electric circuit extending from the battery of the car and connecting to the binding posts 20 and 21 which extend from the outer side of the transmission case and in turn connect to the electro-magnet. The electric circuit which energizes the electro-magnet is intended to be closed through the ordinary ignition switch with which the car is provided, from which it will, as will appear below, be apparent that when the switch is closed, or in other words when the motor of the car is in operation or in readiness to be operated by the closing of the ignition circuit, the electro-magnet will be energized, and when the switch is open and the motor is stopped the magnet will be de-energized.

Assuming that the parts are in the position disclosed in Figure 2, which shows the locked position of the device. When in this position the two key-holes 12 and 16 are in registration so that the key 13 can be placed therethrough to operate the lock 14. The lock 14 is provided with an elongated movable cam member 22, which, when the lock is opened, is turned to the position disclosed in Figure 3. Such turning movement of the cam member 22 swings the lever 11 about its axis 9 and causes the end of said lever to be brought into contact with the electro-magnet 19. The lever 11 is provided on its face nearest to the magnet, with a plate or disk 23 which contacts with the magnet. At this point the ignition switch is closed and the magnet is energized. The energizing of the magnet causes it to magnetically retain the lever 11 out of engagement with the gear lever 5. The key 13 is now turned about its axis to turn the lock cam member 22 back to its closed position, as disclosed in Figures 2 and 4 and the key is withdrawn from the lock and out of the key-holes 12 and 16.

The lower lever 11 is provided with a stud 24 extending from its upper face, and extending from this stud to a like stud 25, which is secured in a recess 26 in the lever 10, is a spring 27. This spring 27 normally tends to draw the two levers 10 and 11 toward one another. Thus, when the key 13 has been withdrawn from the key-hole 16 in the lever 10, the spring 27 draws the lever 10 over towards the lever 11, which is at this time held by the magnet 19. The lever 11 is provided with an upwardly projecting lug 28 which acts as an abutment for the lever 10 and limits the movement of the same. When in this position, which is disclosed in Figure 4, it will be seen that the two locking levers 10 and 11 are held as a unit away from and out of engagement with the gear lever 5. This is the unlocked position of the device, and it will be apparent that when in this position, the locking levers will in no manner interfere with the movements of the gear-shift lever, so that the gears in the transmission may be freely shifted and the car operated.

As soon as the car is brought to a stop and the ignition switch is turned off to cease the operation of the motor, the magnet 19 will be de-energized and will release its magnetic force on the lever 11. Under the influence of a spring $28^a$, which is secured to one of the walls of the case 1, and which bears against the lever 11, the lever 11 is forced over to engage the gear-shift lever 5. The lug 28, bearing against the lever 10 causes said lever to be moved as a unit with the lever 11 so that the two levers 10 and 11 are swung together to both embrace the gear-shift lever 5. When in this position, as shown in Figure 2, the gear-shift lever is held against movement and can only be released by using the key 13 to shift the lever 11 over to the magnet, as previously pointed out.

From the foregoing it will be apparent that the possibility of an owner or operator failing to lock his car will be avoided, as the locking of the transmission through the mechanism herein described will be entirely automatic. As the operation of the motor of the car is stopped by the use of the ignition switch, and the de-energizing of the magnet 19 is caused by the shutting off of the same switch, it will be seen that the movement of the switch in stopping the running of the motor will automatically release the hold of the magnet on the lever 11, and said lever, together with the lever 10, will be moved into locked position about the gear lever 5 by the spring $28^a$ and can only be released by the use of the key 13.

By the use of the two levers 10 and 11 it will be seen that the lock is not completely unlocked until the key 13 is removed from the key-holes, for as long as this key remains in position in the key-hole 16 it retains the yoke 17 on the lever 10 in engagement with the gear-shift lever 5. When the key 13 is removed however, the lever 10 is free to be drawn over towards the lever 11 and then both levers 10 and 11 are disengaged from the gear-shift lever 5 which is free to be operated. From this it will be seen that unless the key is removed from the lock, the lock is not fully unlocked. This constitutes an important feature of my invention for it prevents the car owner from inadvertently leaving the key in the lock after the unlocking operation thus leaving the car a ready prey for a thief.

It will be apparent that the mechanism herein disclosed can be modified in many ways to enable the same to be applied to the various forms of transmissions in use on cars at the present time. I have shown my improved locking device as applied to a gear-shifting lever but it will be apparent that the same may be readily applied to any operating lever necessary to the operation of an automobile. It will therefore be obvious that my invention is not to be restricted to the exact embodiment shown, but is broad enough to cover all structures coming within the scope of the annexed claims.

What I claim is:—

1. A device of the class described comprising a gear-shifting means, a pair of locking members adapted to engage said gear-shifting means and prevent movement thereof, a lock for said locking members, a key for shifting one of said locking members out of engagement with the gear-shifting means, and means for retaining the other locking member in engagement with the gear-shifting means until the key has been removed from the lock.

2. A device of the class described comprising a transmission casing, a key-hole therein, a gear-shifting means, a pair of locking members, a lock, a key-hole in one of said locking members adapted to be held in alignment with the key-hole in the casing when the locking members are in engagement with the gear-shifting means, a key adapted to pass through both of said key-holes to operate the lock, means on said lock for disengaging one of said locking members from the gear-shifting means, means for retaining said lever in its disengaged position, and means for disengaging the other lever from the gear-shifting means after the key has been removed from the key-hole in the last mentioned lever.

3. A device of the class described comprising gear-shifting means, locking means for engaging the same, means for causing said locking means to be partly disengaged from said gear-shifting means, a key for said locking means, and means for engaging said key to cause the same to retain a part of said locking means in locked position until said key is removed from engagement with the locking means.

4. A device of the class described comprising gear-shifting means, locking means adapted to engage the same, an ignition circuit switch, an electro-magnet adapted to be energized when said switch is closed, means for moving the locking means out of engagement with the gear-shifting means and moving said locking means to the magnet, and means for moving said locking means into locking engagement with the gear-shifting means when the magnet is de-energized.

5. A device of the class described comprising a gear-shifting member, a pair of levers, a lock for moving one of said levers, an electro-magnet to which said lever is moved by the lock, a key-hole in the other lever through which a key for the lock is adapted to extend, means for causing the last mentioned lever to be moved to the first mentioned lever when the key is removed from the key-hole and means for causing both of said levers to be moved away from the magnet.

6. A device of the class described comprising a car-operating lever, a pair of locking members adapted to restrain movement of said car-operating member, an electro-magnet and means for energizing the same, means for shifting one of said locking members out of engagement with the car-operating member and moving the same to the magnet, means for moving the other lever over to the first mentioned lever when the same is moved to the magnet, and means for causing an engagement of both of said levers with the car-operating lever when said levers are released by the magnet.

7. A device of the class described comprising a gear-shifting member, a pair of independently movable levers, means on said levers for engaging the gear-shifting member and preventing shifting movement thereof, an electro-magnet, an electric circuit for energizing the same, a switch for said circuit, means for shifting one of said levers to disengage the same from the gear-shifting member, means for engaging the other lever to hold the same engaged with the gear-shifting lever until said lever-retaining means is removed from engagement with said lever, means for causing said levers to be moved towards one another and held together as a unit by the magnet, and means for moving said levers into engagement with the gear-shifting member when said levers are freed from the magnet by the operation of the switch.

8. A device of the class described comprising a car-operating member, locking means therefor, said locking means comprising a pair of locking members, an opening in one of said members, means for shifting one of said members out of engagement with the car-operating member and means adapted to enter the opening in the other locking member and retain the same in engagement with the car-operating member until removed from said opening.

9. A device of the class described comprising a car-operating member, a pair of locking members therefor, a cam member to move one of said locking members out of engagement with the car-operating member, a key for moving said cam member, an opening in the other locking member through which said key extends to move the cam member, and means for causing said last mentioned locking member to move into alignment with the first mentioned locking member when the key is removed from the opening.

Signed at the city, county and State of New York, this 23rd day of October, 1922.

HERBERT SCHIFF.